US006041153A

United States Patent [19]

Yang

[11] Patent Number: 6,041,153

[45] Date of Patent: Mar. 21, 2000

[54] CONTINUOUS COMPOSITE REINFORCED BUFFER TUBES FOR OPTICAL FIBER CABLES

[75] Inventor: Houching M. Yang, Conover, N.C.

[73] Assignee: Alcatel, Paris, France

[21] Appl. No.: 09/108,683

[22] Filed: Jul. 1, 1998

[51] Int. Cl.[7] ........ G02B 6/44

[52] U.S. Cl. ........ 385/109; 385/100; 385/106; 385/107; 385/113; 385/114

[58] Field of Search ........ 385/100–114

[56] References Cited

U.S. PATENT DOCUMENTS

| | | | |
|---|---|---|---|
| 4,693,551 | 9/1987 | Blanco et al. | 385/103 |
| 4,730,894 | 3/1988 | Arroyo | 385/103 |
| 4,743,085 | 5/1988 | Jenkins et al. | 385/103 |
| 4,770,489 | 9/1988 | Saito et al. | 385/109 |
| 4,844,575 | 7/1989 | Kinard et al. | 385/109 |
| 4,875,757 | 10/1989 | Greveling | 385/109 |
| 4,883,622 | 11/1989 | Dealy et al. | 264/108 |
| 5,029,974 | 7/1991 | Nilsson | 385/109 |
| 5,031,996 | 7/1991 | Saller et al. | 385/100 X |
| 5,082,348 | 1/1992 | Gartside, III et al. | 385/111 |
| 5,224,192 | 6/1993 | Wagman | 385/112 |
| 5,307,843 | 5/1994 | Jarrin et al. | 138/174 |
| 5,320,788 | 6/1994 | Schneider et al. | 264/1.5 |
| 5,345,526 | 9/1994 | Blew | 385/112 |
| 5,469,523 | 11/1995 | Blew et al. | 385/101 |
| 5,509,097 | 4/1996 | Tondi-Resta et al. | 385/113 |
| 5,561,729 | 10/1996 | Parris | 385/113 |
| 5,574,816 | 11/1996 | Yang et al. | 385/109 |

*Primary Examiner*—Phan T. H. Palmer
*Attorney, Agent, or Firm*—Ware, Fressola, Van Der Sluys & Adolphson LLP

[57] ABSTRACT

A composite reinforced buffer tube for an optical fiber cable is disclosed. The composite reinforced buffer tube comprises an extruded elongated thermoplastic matrix having an elongated, substantially continuous, reinforcement incorporated therein along its length between its inside and outside walls. The substantially continuous reinforcing is co-extruded with the elongated thermoplastic matrix and bonded to the matrix at interface regions therebetween. The material forming the reinforcement has a higher modulus of elasticity than the material forming the thermoplastic matrix, and the reinforcement material has a coefficient of thermal expansion that is less than the thermoplastic matrix material. The strength properties of the buffer tube can be finely tailored by the size, shape and positioning of the co-extruded reinforcement as well as the number of reinforcements.

20 Claims, 6 Drawing Sheets

10
Am
12
14a
Ar
20
22
20
14a
Ar
20
16
18

CONTINUOUS COMPOSITE REINFORCED BUFFER TUBES FOR OPTICAL FIBER CABLES

BACKGROUND OF THE INVENTION

1. Field of the Invention

The present invention relates to optical fiber cables. More particularly, the present invention relates to buffer tubes for optical fiber cables which are reinforced with a substantially continuous composite material.

2. Description of the Prior Art

Optical fiber cables are used to transmit information at high rates and very long distances. The transmission medium of the optical fiber cable are hair-thin optical fibers. These fibers are protected from external forces and elements by precisely designed and manufactured cable structures, such as buffer tubes for example.

To protect the hair-thin optical fibers, it is desirable to have a buffer tube made from a material with a high Young's modulus. The use of a material with a high Young's modulus results in a buffer tube having relatively high tensile and compressive resistance capability, a trait useful in protecting the optical fibers in the event a cable incorporating such buffer tubes is twisted, stretched or compressed. In addition to the high Young's modulus, it is also important that the material selected for making a buffer tube have a low thermal expansion coefficient. Significant shrinkage or expansion of the core or buffer tube caused by temperature changes can place undesirable tensile or compressive loads on the optical fibers residing therein. High tensile or compressive loads can result in damaged or broken optical fibers or cause too much microbending which results in significant signal attenuation. Of course, in addition to the physical properties of materials, the cost of raw materials and the cost of processing such materials is also a factor that must be taken into account when designing an optical fiber cable. Finally, the material must have good handling characteristics that enable a technician to gain access to the fibers protected by the tube made therefrom.

In the past, single layer optical fiber cable buffer tubes have been used to protect such optical fibers. These single layer tubes have been manufactured from materials such as polybutylene terephthalate (PBT) or polyamide (PA). PBT buffer tubes were widely used in the past but due to the rigidity, hydrolytic instability and relatively high density and material cost of PBT, cables can now be made with polypropylene buffer tubes reinforced with glass fibers as disclosed in U.S. Pat. No. 5,561,729, or polypropylene/polyethylene copolymer buffer tubes as described in U.S. Pat. No. 5,574,816. As those skilled in the art will appreciate, the physical properties of single layer tube designs are obviously limited by the materials which make up the tube. One drawback of the glass fiber reinforced polypropylene buffer tubes disclosed in U.S. Pat. No. 5,561,729 is that such tubes can be very stiff and therefore make access to the fibers very difficult.

Dual layer buffer tubes made from a layer of a polyolefin material and a layer of a polyester material, such as that described in U.S. Pat. No. 5,031,996, have been proposed to overcome some of the physical property limitations of single layer buffer tubes. However, such dual layer tubes are known to be difficult to process and difficult to handle in the field due to high tube rigidity.

Accordingly, it is desirable to provide a buffer tube structure that has some of the physical property advantages provided by the dual layer construction without the known processing and handling difficulties. It is also desirable to provide a buffer tube made from a material which experiences low post extrusion shrinkage.

SUMMARY OF THE INVENTION

It is an object of the present invention to provide a buffer tube for an optical fiber cable that has high strength, low shrinkage, good flexibility, improved processability and low cost.

It is also an object of the present invention to provide a method for making a buffer tube for an optical fiber cable that has high strength, low shrinkage, good flexibility, improved processability and low cost.

The present invention is designed to meet the foregoing objectives by providing a composite reinforced buffer tube comprising an extruded elongated thermoplastic matrix having elongated, substantially continuous, reinforcement incorporated therein along its length between its inside and outside walls. The continuous reinforcement is co-extruded with the elongated thermoplastic matrix and bonded to the matrix at interface regions therebetween. The reinforcement has a higher flexural modulus than the thermoplastic matrix, and also has a coefficient of thermal expansion less than the thermoplastic matrix.

The invention will be more fully understood when reference is made to the following detailed description taken in conjunction with the accompanying drawings.

BRIEF DESCRIPTION OF THE DRAWINGS

The drawings, not drawn to scale, include.

DETAILED DESCRIPTION OF THE PRESENT INVENTION

Figure 1A:
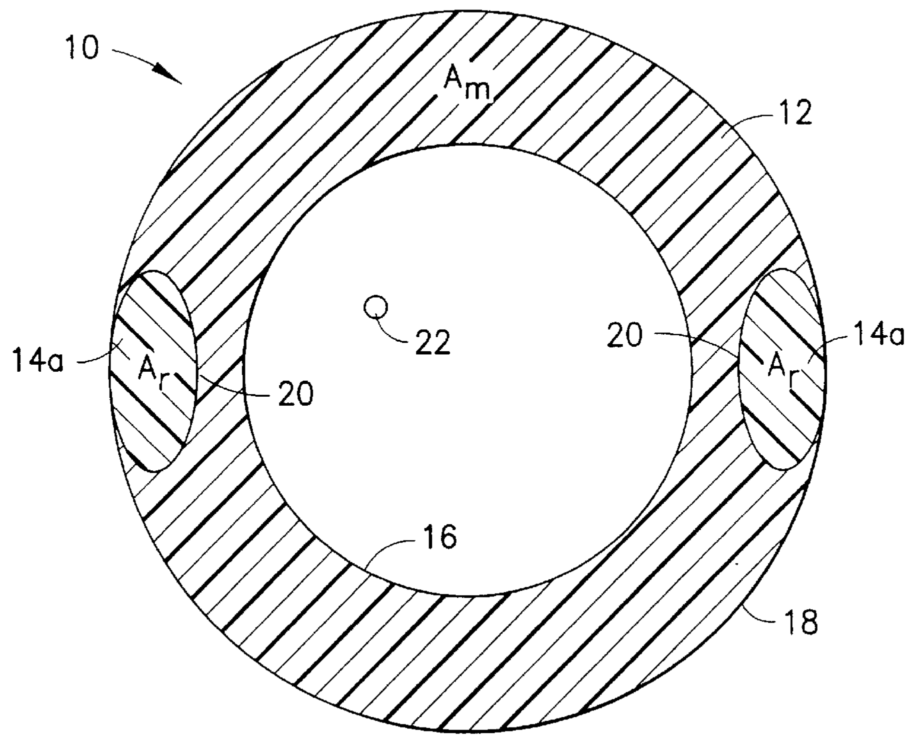
FIG. 1*a*, which is a cross-sectional view of one embodiment of a buffer tube according to the present invention.

Referring to FIGS 1*a* through 1*f*, several embodiments of a composite reinforced buffer tubes 10 made according to the present invention are illustrated. In each of these embodiments, the buffer tubes comprise an extruded elongated thermoplastic matrix 12 of cross-sectional area $A_m$ having an elongated, substantially continuous, reinforcement 14*a*–14*e* of cross-sectional area $A_r$ incorporated therein between its inside 16 and outside 18 walls. The continuous reinforcements 14*a*–14*e* in each of the embodiments are co-extruded with the elongated thermoplastic matrix 12 and are thereby bonded to the matrix at interface regions therebetween 20. Adhesives may also be employed to provide bonding between the matrix and the reinforcements at the interface region. The reinforcements 14*a*–14*e* are substantially continuous in length from the first end 23 of the buffer tube 10 to the second end 24 because they are co-extruded with the matrix 12. One or more communications elements 22, such as an optical fiber or optical fiber ribbon, are typically disposed within the buffer tube 10.

According to the present invention, the reinforcement material 14*a*–14*e* is selected so as to have a higher flexural modulus than the thermoplastic matrix material 12 forming the majority of the buffer tube. The flexural modulus of the reinforcement material and the matrix material may be measured according to the methods described in ASTM D790. Preferably, the reinforcement material 14*a*–14*e* is also selected so as to have a coefficient of thermal expansion less than the thermoplastic matrix material 12 as measured according to the methods described in ASTM D696.

Generally, the materials that may be used to form the thermoplastic matrix 12 include polyesters, polyamides, polyolefins and polymerized fluorocarbons. More specifically, the typical materials that may form the matrix 12 are polybutylene terephthalate (PBT), polycarbonate (PC), polyamide (nylon), polyvinyl chloride (PVC), polyvinylidene difluoride (PVDF), polyacetal, polypropylene, polyethylene and various copolymers of these materials. Preferably, the material forming the matrix is a nucleated polypropylene-polyethylene copolymer. This copolymer will be more fully described below.

Generally, the materials that may be used to form the co-extruded reinforcements 14*a*–14*e* can be the same as those forming the matrix 12, namely: polyesters, polyamides, polyolefins and polymerized fluorocarbons. However, the reinforcement material selected must have a higher flexural modulus and preferably a lower coefficient of thermal expansion than the matrix material. More specifically, the typical materials useful for forming the substantially continuous reinforcement 14*a*–14*e* include PBT, PC, nylon, PVC, PVDF, polyacetal, polypropylene and polyethylene and copolymers thereof. Preferably, the reinforcement material is also a nucleated polypropylene-polyethylene copolymer. For example, the matrix 12 may be formed from a nucleated polypropylene-polyethylene copolymer while the reinforcement 14*a*–14*e* may be formed from PBT.

In addition to the polymeric materials described above, the matrix 12 or the reinforcements 14*a*–14*e* may include filler materials and/or fibrous materials. The filler materials include talc, mica, silica and carbon black. The fiberous materials include glass, aramid, carbon, metals, ceramics and thermoplastics, such as Nylons and polyesters.

In a preferred embodiment, the thermoplastic matrix 12 is formed with a polypropylene-polyethylene copolymer resin incorporating nucleating agents in the copolymer melt prior to extrusion of the thermoplastic matrix. Nucleating agents that can be incorporated into the resin include: inorganic materials such as talc, mica, silica, carbon black and kaolin; salts of aliphatic monobasic or dibasic acids or arylalkyl acids such as sodium succinate, sodium glutarate, sodium caproate, sodium 4-methylvalerate, aluminum phenylacetate and sodium cinnamate; or alkali metal or aluminum salts of aromatic or alicyclic carboxylic acids, such as aluminum benzoate, sodium or potassium benzoate, sodium β-naphthoate, lithium benzoate, and aluminum tert.-butylbenzoate. The nucleating agents form nuclei for growth of crystals in the polypropylene-polyethylene copolymer melt. A high degree of crystallinity and a more uniform crystalline structure is obtained by adding the nucleating agent to the copolymer melt. The nucleating agent increases the flexural modulus, yield and tensile strength, compression resistance and dimensional stability of the copolymer as well as reduces the coefficient of thermal expansion. Any nucleating agent added to the polypropylene-polyethylene melt to improve the above mentioned physical properties should be properly dispersed in the polymer melt. It has been found that concentrations of up to 0.5 weight percent provide the maximum enhancements of the copolymer's physical properties and higher concentrations of nucleating agents may not produce further enhancements of the copolymer's physical properties.

The reinforcements 14*a*–14*e* are preferably formed from the same nucleated copolymer that forms the matrix 12, but is mixed with up to 30% by weight of glass fibers. The glass fibers must be blended into the copolymer melt prior to the buffer tube extrusion process.

Stamylan 83E10N and 63G1030 polypropylene resins supplied by DSM Engineering Plastics of Geleen, The Netherlands can be used as resins for both the matrix 12 and the reinforcement 14*a*–14*e*, respectively. These resins can be extruded as the matrix 12 and also as the reinforcement 14*a*–14*e* with a Maileffer 45 mm single screw extruder, a Nokia-Maileffer model 4/6 crosshead using a screen pack of 20/40/80 mesh, and a screw having double flights in its feed section, double barriers in its metering section, a length to diameter ratio of 20 to 1 and a compression ratio up to 2 to 1. The matrix 12 and the reinforcements 14*a*–14*e* may be made by co-extrusion with the above described apparatus according to the processing and tooling parameters set forth in Table 1.

TABLE 1

| | |
|---|---|
| Line Speed | 30.1 meters/min |
| Die/Trough Distance | 7.5" |
| Melt Temp. | 419° F. |
| Screw Speed | 22.0 rpm |
| Gel Output | 34.0 rpm |
| Gel Temp. | 123° F. |
| lst Trough Temp. | 48.2° F. |
| 2nd Trough Temp. | 64.0° F. |
| Tube Outside Diameter (OD) | 0.120" |
| Tube Inside Diameter (ID) | 0.081" |
| Tube Wall Thickness | 0.020" |
| Die ID | 0.270" |
| Tip OD | 0.180" |
| Tip ID | 0.140" |
| Gel Needle (OD × ID) | 0.100" × 0.120" |
| Resin Drying Temp. | 130° F. for more than 4 hours |
| Extruder Temp. Profile | 185/195/200/212/240/240° C. |

Of course, it will be appreciated by those skilled in the art that variations on the above mentioned starting materials, tooling and processing parameters can be made without deviating from the spirit and scope of the present invention.

Figure 2:
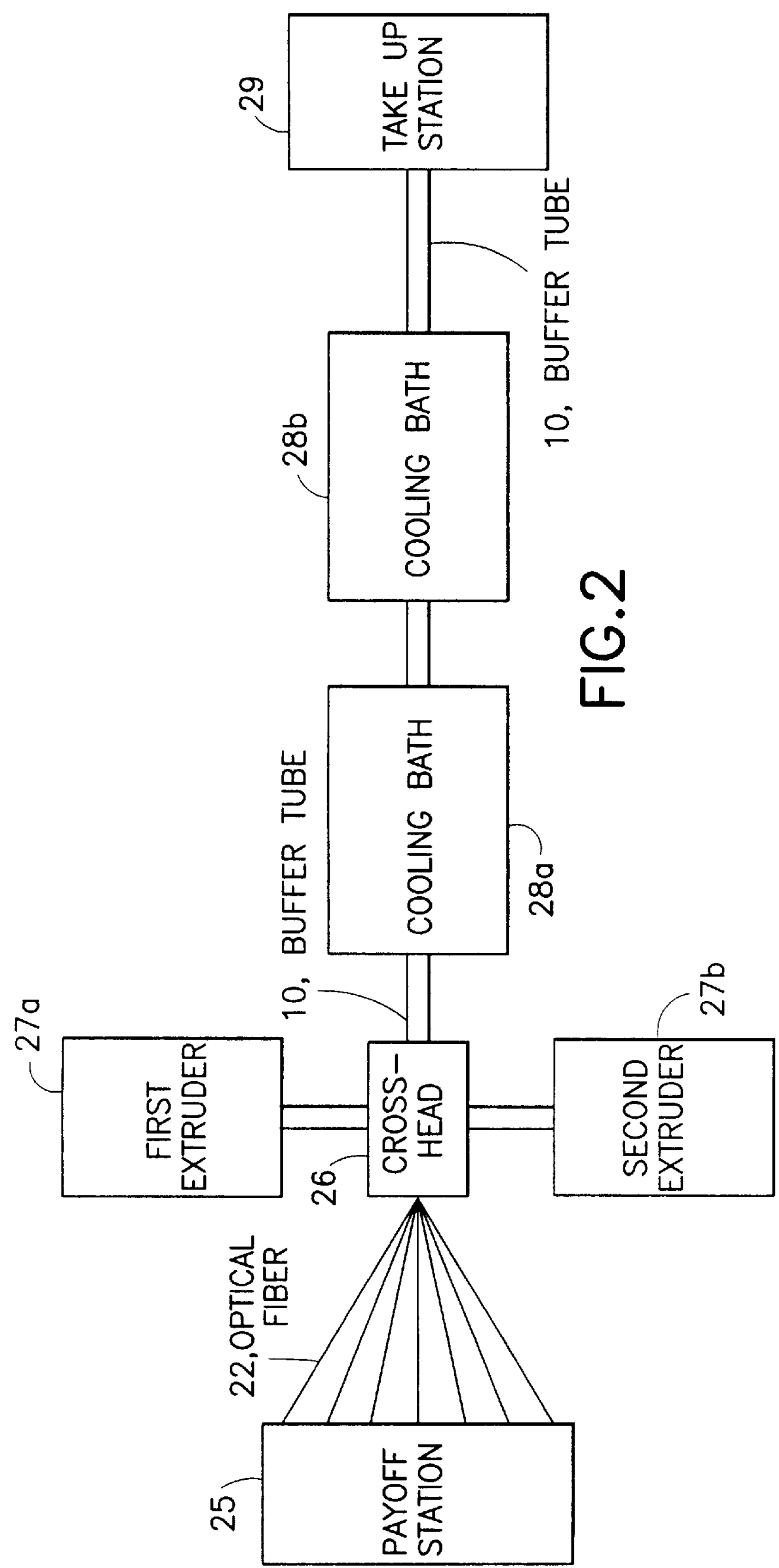
FIG. 2, which is a schematic diagram of the apparatus for making the buffer tube of the present invention.

FIG. 2 is a schematic diagram illustrating the apparatus uses to make the buffer tubes of the present invention. Optical fibers 22 are taken from payoff station 25 and fed through an extrusion cross-head 26. A first extruder 27*a* supplies the cross-head 26 with the matrix material while a second extruder 27*b* supplies the cross-head 26 with the reinforcing material for co-extrusion. The substantially continuous reinforced buffer tube 10 exits the cross-head 26 and is passed sequentially through at least one, but preferably, two cooling baths 28*a*, 28*b*. The cooled buffer tube 10 containing optical fiber 22 is gathered on a buffer tube take up station 29.

The properties imparted by the reinforcements to the buffer tube may be controlled in several ways and will depend, in part, on the choice of materials for both the matrix and the reinforcement. In one manner, the reinforcement properties can be controlled by choosing the ratio of the cross-sectional area $A_r$ of the reinforcement to the cross-sectional area of the matrix $A_m$. Preferably, the ratio of $A_m$ to $A_r$ is in the range of about 5 to 1 to about 100 to 1. The properties imparted by the reinforcement may also be controlled by the way the reinforcements are distributed in the matrix material and also by the particular shape given to the reinforcements as well as the orientation of the reinforcements in the matrix if the reinforcements have a cross-sectional shape which is other than circular.

Figure 1B:
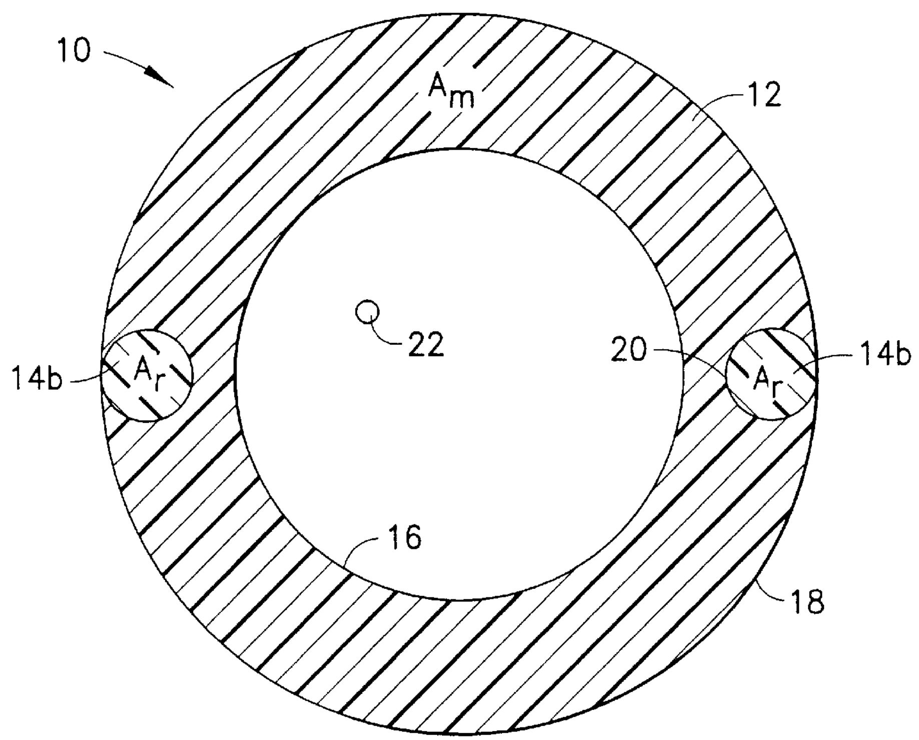
FIG. 1*b*, which is a cross-sectional view of a different embodiment of a buffer tube according to the present invention.
Figure 1C:
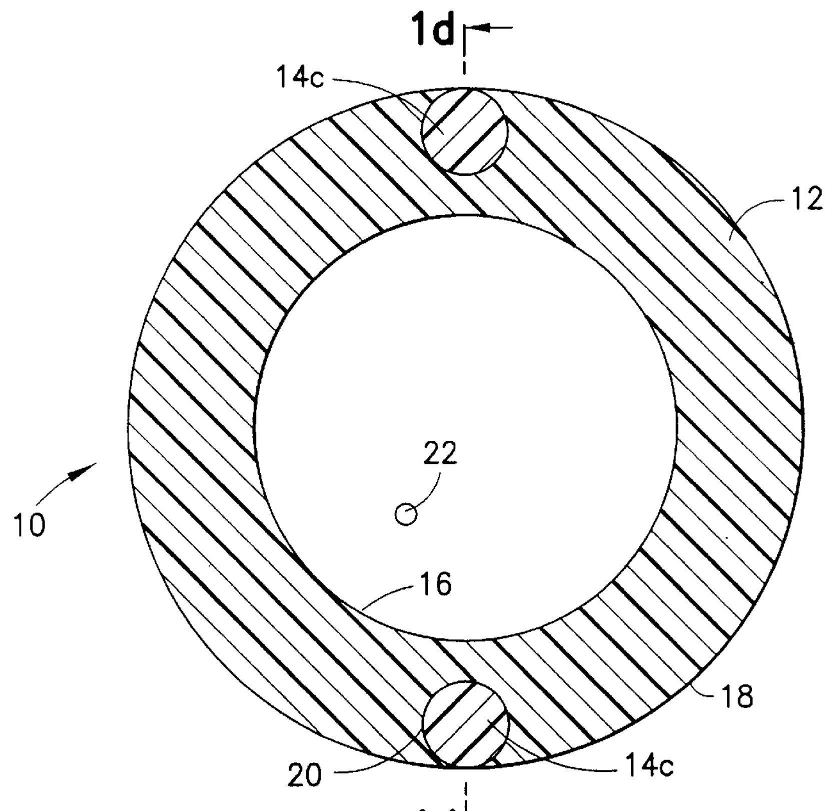
FIG. 1*c*, which is a cross-sectional view of yet another embodiment of a buffer tube according to the present invention.
Figure 1D:
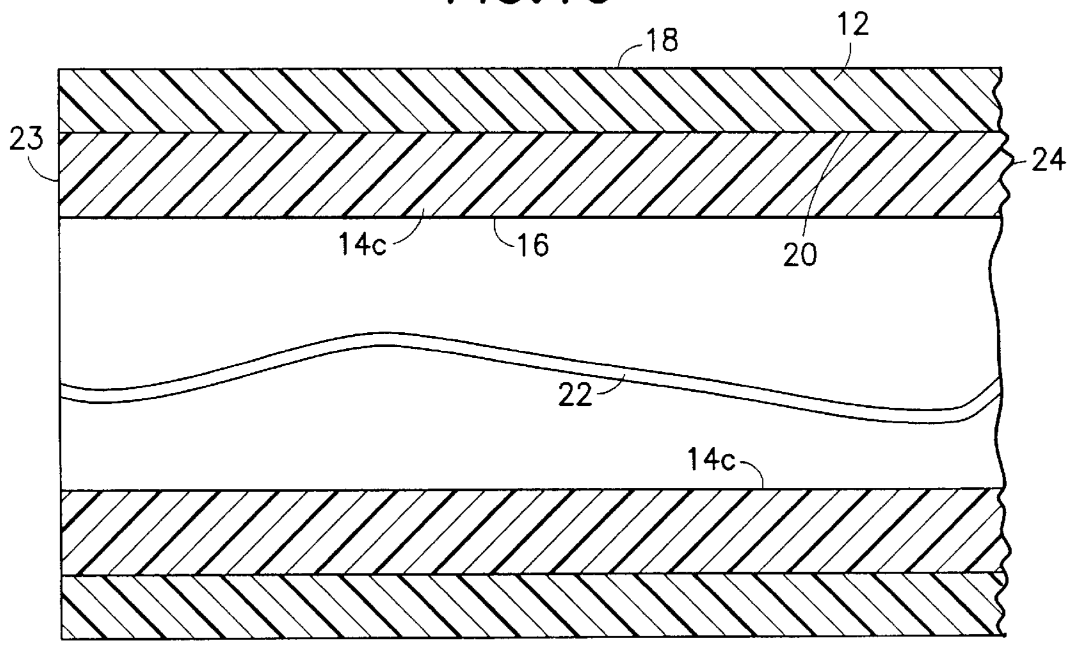
FIG. 1*d*, an cross-sectional view of the embodiment of the buffer tube illustrated in FIG. taken along the line 1*d*—1*d*.
Figure 1E:
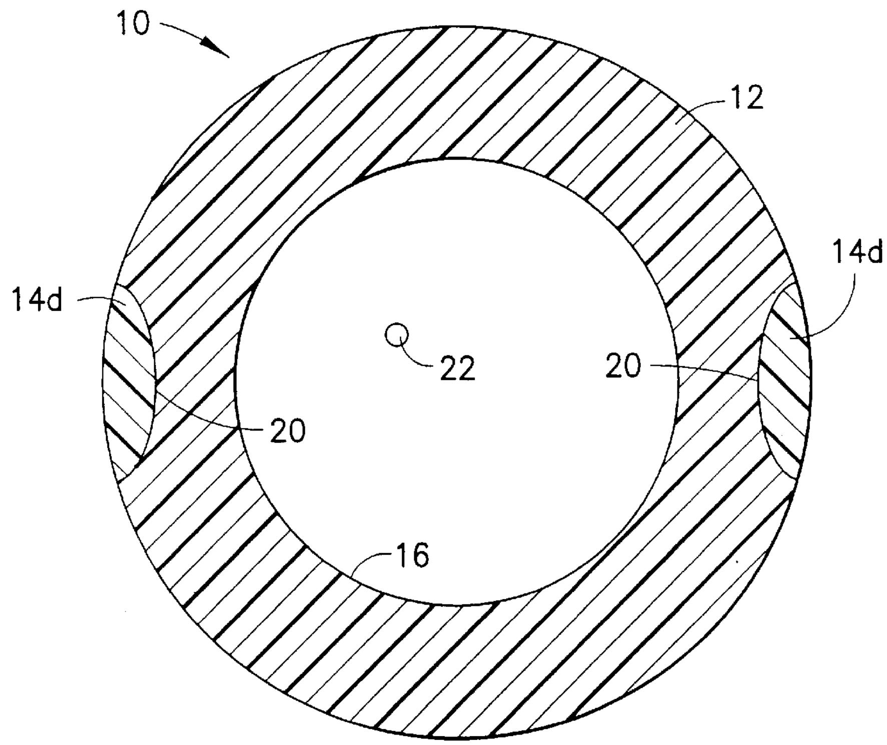
FIG. 1*e*, which is a cross-sectional view of yet another embodiment of a buffer tube according to the present invention.
Figure 1F:
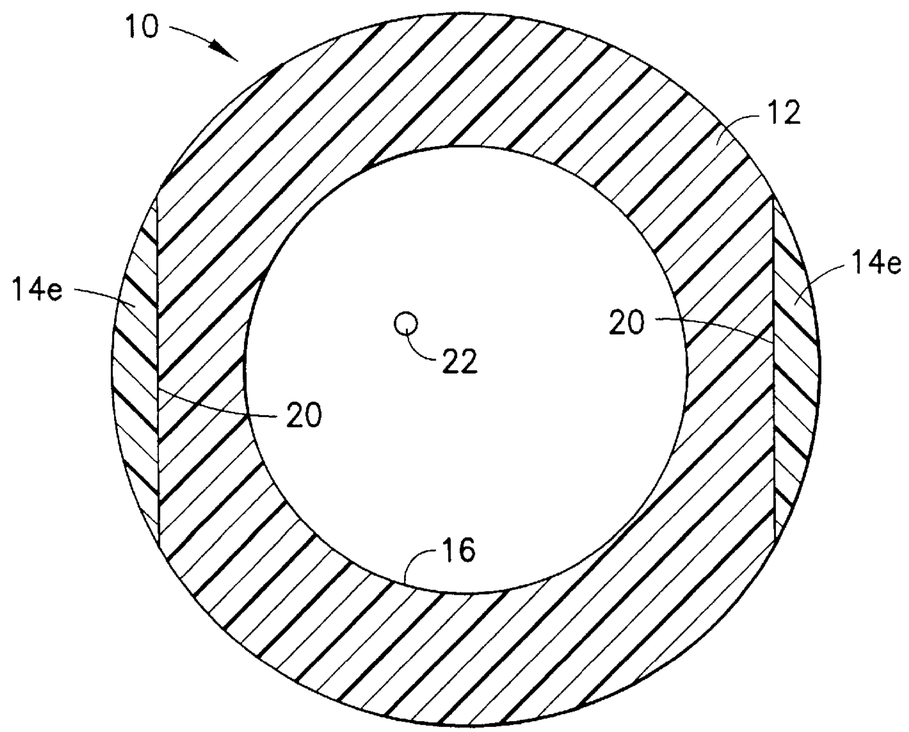
FIG. 1*f*, which is a cross-sectional view of still another embodiment of a buffer tube according to the present invention.

Referring to the embodiment illustrated in FIG. 1*a*, the reinforcements 14*a* have an elliptical cross-sectional shape. The short axes of the ellipses are radially aligned with the axis defined by the tube 10. Alternatively, the ellipses could be oriented so that the long axes are aligned with the axis of the tube. Of course, some other alignment between those described could also be obtained, if desired. As illustrated in FIG. 1*b*, the reinforcements 14*b* may have a circular cross-sectional shape. With this shape, reinforcement orientation is not available. However, referring to the embodiment illustrated in FIG. 1*c*, the reinforcements 14*c* having a generally circular cross-sectional shape may be positioned adjacent to the inner wall 16 of the matrix material 12 as compared to adjacent to the outer wall 18 in the embodiment illustrated in FIG. 1*b*. It should be understood by those skilled in the art that the cross-sectional shapes of the reinforcing material as well as the location and distribution of such reinforcements are merely for illustration purposes. Those skilled in the art will now appreciate that the reinforcements may be co-extruded with any shaped cross-section desired, with any distribution, orientation and positioned anywhere between the inner 16 and outer 18 walls of the matrix 12, as evidenced by the pie shaped reinforcement member illustrated in FIG. 1*d* and the half moon shaped reinforcement member illustrated in FIG. 1*e*.

Figure 3:
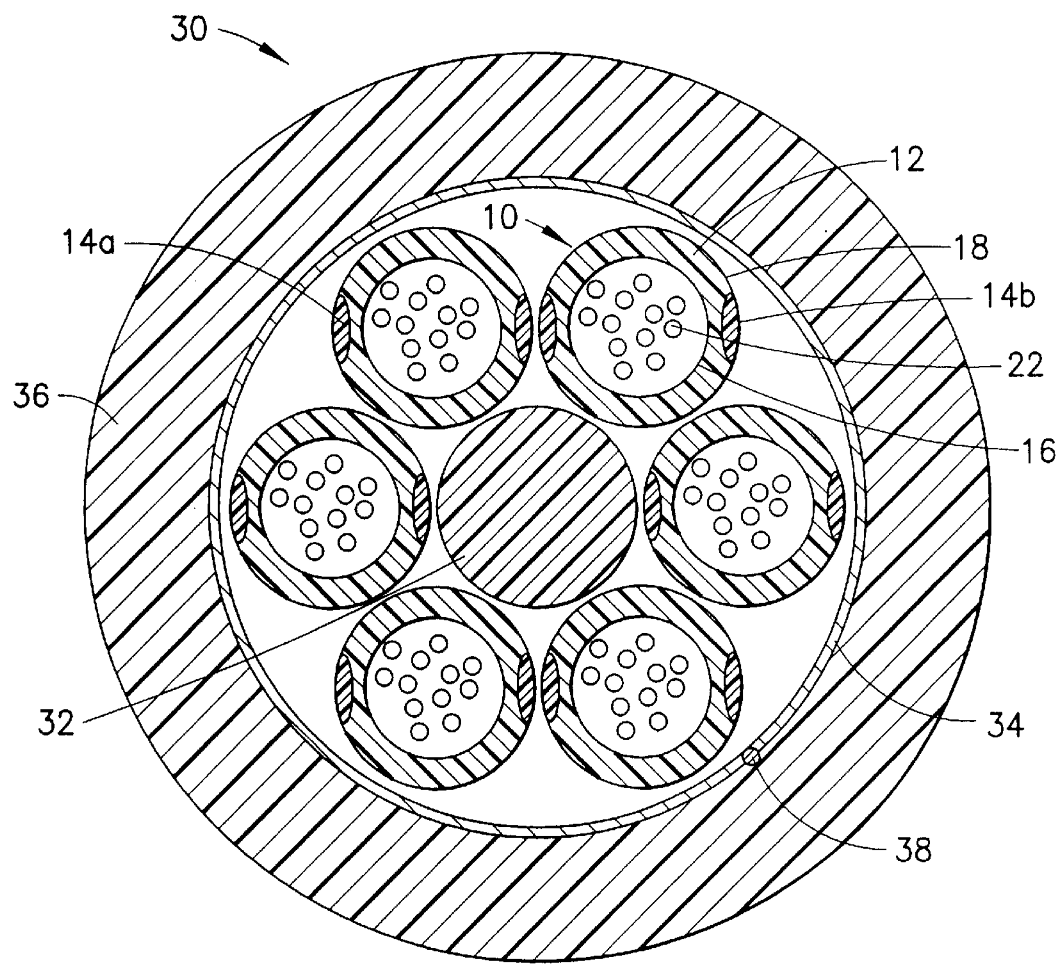
FIG. 3, which cross-sectional view of a stranded optical fiber cable incorporating buffer tubes of the present invention.

Referring to FIG. 3, there is shown a typical stranded optical fiber cable 30. The cable 30 has a core comprised of a plurality of buffer tubes. At least one of the buffer tubes is a reinforced buffer tube 10 of the present invention. The buffer tubes house optical fibers 22, and are stranded about a central strength member 32. A core wrap 34 may positioned over the core. Water blocking materials (not shown) may be disposed in the core, if desired. A protective outer jacket 36 is disposed over the core and a ripcord 38 is provided near the interface of the wrap 34 and the outer jacket 36.

Figure 4:
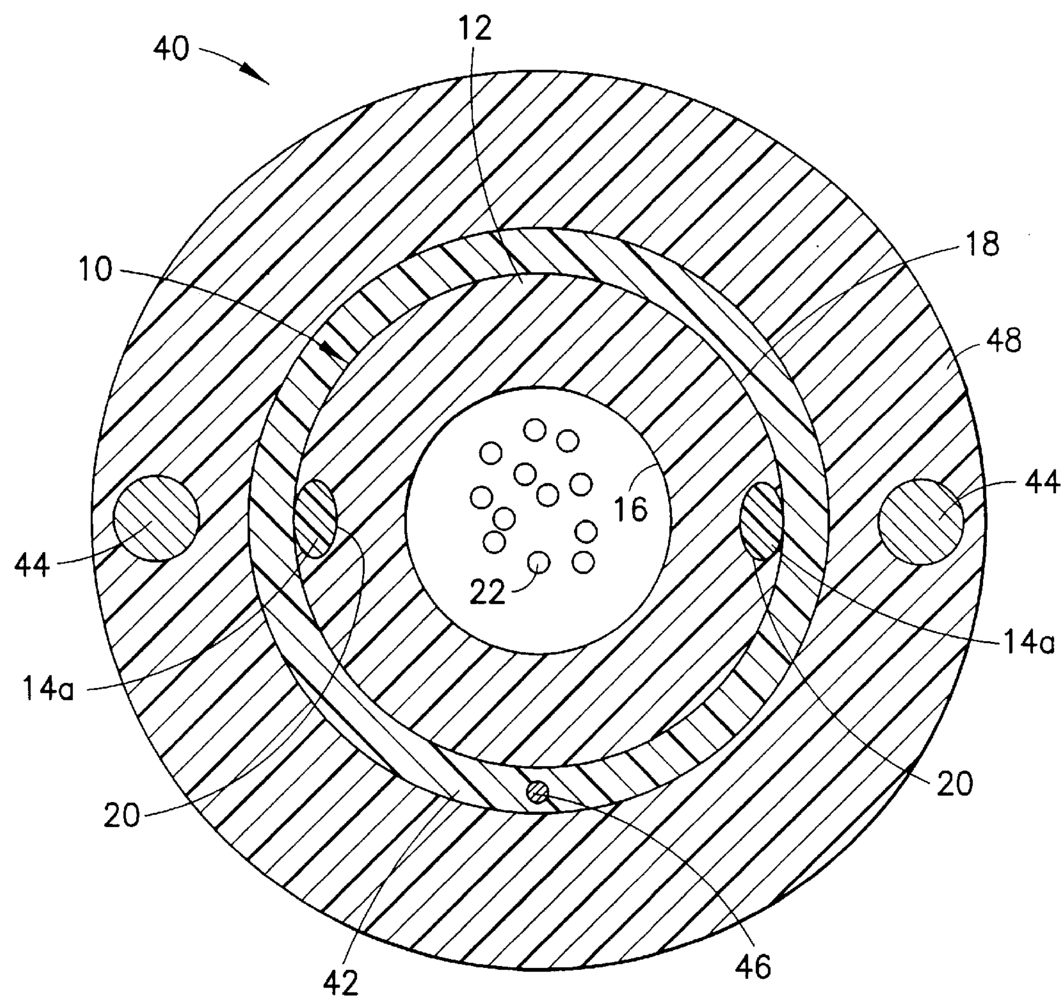
FIG. 4, which is a cross-sectional view of a mono-tube optical fiber cable incorporating a buffer tube of the present invention.

FIG. 4 generally illustrates a non-armored mono-tube type cable structure 40 incorporating the reinforced buffer tube of the present invention. This structure includes a single, large, gel-filled buffer tube 10 made according to the present invention. A thixotropic, water-blockable gel (not shown) may be disposed in the buffer tube 10. The gel-filled buffer tube 10 contains a plurality of optical fibers 22. Radial strength yarns 42, made from either aramid, polyethylene, polyester, or fiberglass materials, are contra-helically stranded around the buffer tube 10 and impregnated with flooding compounds such as a petroleum based hot melt filling compound manufactured by Witco or Amoco. The flooding compounds may be replaced by water swellable yarn or tape. Two metallic or dielectric strength members 44 are located 180 degrees apart on the outside of the radial strength yarns 42. A high strength rip cord 46 is applied over the radial strength yarns 42 to aid in sheath removal. A medium-density polyethylene (MDPE) outer jacket 48 encapsulates the strength members 44 and radial strength yarns 42 to complete the structure. The MDPE of jacket 48 may be filled with carbon black powder.

Thus, it can be seen from the foregoing specification and attached drawings that the present invention provides an effective buffer tube for housing optical fiber transmission media and an effective method for making the same. As compared to the prior art, the buffer tubes made according to the present invention provide a less expensive, easier to process, rugged housing for optical fibers.

The embodiments disclosed herein admirably achieve the objects of the present invention; however, it should be appreciated by those skilled in the art that departures can be made by those skilled in the art without departing from the spirit and scope of the invention which is limited only by the following claims.

What is claimed is:

1. A composite reinforced buffer tube comprising an extruded elongated thermoplastic matrix having elongated, substantially continuous, reinforcement incorporated therein along its length between its inside and outside walls, wherein the continuous reinforcement is co-extruded with the elongated thermoplastic matrix and bonded to the matrix at interface regions therebetween, wherein the reinforcement has a higher flexural modulus than the thermoplastic matrix, and wherein the reinforcement has a coefficient of thermal expansion less than the thermoplastic matrix.

2. The composite reinforced buffer tube of claim 1, wherein the matrix is formed from a material selected from the group consisting of polyesters, polyamides, polyolefins and fluorocarbon polymers.

3. The composite reinforced buffer tube of claim 1, wherein the matrix is formed from a material selected from the group consisting of polybutylene terephthalate, polycarbonate, polyamide, polyvinyl chloride, polyvinylidene difluoride, polyacetal, polypropylene, polyethylene, and copolymers thereof.

4. The composite reinforced buffer tube of claim 1, wherein the matrix is formed from a nucleated polypropylene-polyethylene copolymer.

5. The composite reinforced buffer tube of claim 1, wherein the elongated, substantially continuous, reinforcement is formed from a material selected from the group consisting of polyesters, polyamides, polyolefins and fluorocarbon polymers.

6. The composite reinforced buffer tube of claim 2, wherein the elongated, substantially continuous, reinforcement is formed from a material selected from the group consisting of polyesters, polyamides, polyolefins and fluorocarbon polymers.

7. The composite reinforced buffer tube of claim 1, wherein the elongated, substantially continuous, reinforcement is formed from a material selected from the group consisting of polybutylene terephthalate, polycarbonate, polyamide, polyvinyl chloride, polyvinylidene difluoride, polyacetal, polypropylene, polyethylene and copolymers thereof.

8. The composite reinforced buffer tube of claim 1, wherein the reinforcement is formed from a nucleated polypropylene-polyethylene copolymer.

9. The composite reinforced buffer tube of claim 1, wherein the material forming the elongated, substantially continuous, reinforcement includes a filler material selected from the group consisting of talc, mica, silica and carbon black.

10. The composite reinforced buffer tube of claim 9, wherein the filler material comprises approximately 5 to 40 weight percent of the reinforcing material.

11. The composite reinforced buffer tube of claim 1, wherein the material forming the elongated, substantially continuous, reinforcement includes a fiberous material selected from the group consisting of glass, aramid, carbon, metals, ceramics, and thermoplastics.

12. The composite reinforced buffer tube of claim 11, wherein the fiberous material comprises approximately 5 to 40 weight percent of the reinforcing material.

13. The composite reinforced buffer tube of claim 11, wherein the material forming the elongated, substantially continuous, reinforcement further includes a filler material selected from the group consisting of talc, mica, silica and carbon black.

14. The composite reinforced buffer tube of claim 13, wherein the fiberous and filler materials comprises approximately 5 to 40 weight percent of the reinforcing material.

15. The composite reinforced buffer tube of claim 1, wherein the matrix has a cross-sectional area of $A_m$ and the reinforcement has a total cross-sectional area of $A_r$, and wherein the ratio of $A_m$ to $A_r$ is in the range of about 5 to 1 to about 100 to 1.

16. The composite reinforced buffer tube of claim 1, wherein the reinforcement is circular in cross-section.

17. The composite reinforced buffer tube of claim 1, wherein the reinforcement is elliptical in cross-section, wherein the ellipse has short and long axes.

18. The composite reinforced buffer tube of claim 17, wherein the short axis of the ellipse radially aligned with the axis defined by the buffer tube.

19. The composite reinforced buffer tube of claim 17, wherein the long axis of the ellipse is radially aligned with the axis defined by the buffer tube.

20. An optical fiber cable, comprising:

a composite reinforced buffer tube comprising an extruded elongated thermoplastic matrix having a plurality of elongated, substantially continuous, reinforcements incorporated therein along its length between its inside and outside walls, the continuous reinforcements being co-extruded with the elongated thermoplastic matrix and bonded to the matrix at interface regions therebetween, wherein the reinforcements have a higher flexural modulus than the thermoplastic matrix, and wherein the reinforcements have a coefficient of thermal expansion less than the thermoplastic matrix; and at least one optical fiber disposed in the buffer tube.

* * * * *